United States Patent [19]
McPhail

[11] Patent Number: 5,431,076
[45] Date of Patent: * Jul. 11, 1995

[54] TRIMMING APPARATUS

[75] Inventor: Bryan G. McPhail, Independence, Mo.

[73] Assignee: Ralph E. Hastings, Raytown, Mo.

[*] Notice: The portion of the term of this patent subsequent to Nov. 1, 2011 has been disclaimed.

[21] Appl. No.: 47,475

[22] Filed: Apr. 19, 1993

[51] Int. Cl.6 ............................... B23B 3/00
[52] U.S. Cl. ......................... 82/1.3; 82/1.4; 82/19; 83/946; 83/565
[58] Field of Search ............... 83/946, 914, 565, 582; 82/1.3, 1.4, 19, 11

[56] References Cited

U.S. PATENT DOCUMENTS

| | | | |
|---|---|---|---|
| 1,406,871 | 2/1922 | Johnson | 82/1.3 |
| 2,410,443 | 11/1946 | Hoffer | 82/19 |
| 3,763,297 | 10/1973 | Del Piero | |
| 3,783,724 | 1/1974 | Uhlig | |
| 3,797,985 | 3/1974 | Garver | |
| 3,842,713 | 10/1974 | Hamilton et al. | 82/1.3 |
| 3,977,585 | 8/1976 | Sagorski | |
| 3,983,769 | 10/1976 | McConnell et al. | 82/19 X |
| 4,030,650 | 6/1977 | Oberloier | |
| 4,343,206 | 8/1982 | Douglass et al. | 82/11 X |
| 4,603,609 | 8/1986 | Takatoshi | 83/914 X |
| 4,665,571 | 5/1987 | Muccione | |
| 4,954,071 | 9/1990 | Austin | 83/914 X |
| 5,038,651 | 8/1991 | Burdick | 83/565 |
| 5,168,787 | 12/1992 | Blaimschein | 83/914 X |

*Primary Examiner*—Rinaldi I. Rada
*Attorney, Agent, or Firm*—Litman, McMahon & Brown

[57] ABSTRACT

An apparatus adapted for trimming a plastic covering from a mouth opening of a blow-molded universal urinal includes a retaining block for rigidly holding the urinal in position opposite a trimming apparatus. The apparatus mechanically moves a knife mounted thereon in an oval pattern in one plane while simultaneously moving the knife in an alternately concave and convex pattern in a second plane orthogonal to the first plane. The knife is mounted on a platform which is itself movable in the second plane independently of the movement of the knife. As the platform is moved toward the urinal mouth, the knife is moved in the described pattern, thus smoothly trimming the urinal mouth.

23 Claims, 5 Drawing Sheets

TRIMMING APPARATUS

BACKGROUND OF THE INVENTION

The present invention relates to a trimming apparatus and more specifically to an apparatus for trimming an opening from a blow-molded container such as a universal portable urinal or the like.

Portable urinals or urine bottles are commonly used by people unable to gain access to normal facilities, such as by bedridden patients in a hospital. Significant disadvantages surround commonly used portable urinals. Most portable urinals are designed to be used by only one sex or the other, requiring hospitals and care providers to maintain inventories of both male and female urinals.

Attempts have been made to produce a universal urinal which is usable by both males and female patients. For example, U.S. Pat. No. 4,665,571 ('571 patent) teaches a portable urinal with an oval mouth which is designed to accommodate a female anatomy. The oval mouth, when viewed from either side of the urinal, presents a concave outline, while, from either end a convex outline is presented. The overall shape is said to be a closed loop on the surface of an imaginary cylinder with an axis parallel to the width of the mouth. The mouth has an inwardly directed flange to avoid sharp edges which could contact a male user's genitalia, and thus, the urinal is said to usable by both male and female patients.

While the design of the universal portable urinal, as taught by the '571 patent, is generally satisfactory, the manufacture of such a container has proven to be problematical. Such portable urinals are usually blow-molded, which is a process in which a plastic material is continuously extruded from an orifice in the shape of a hollow tube. A pair of mold halves enclose a segment of the tube and air is blown into the tube to expand it to the mold configuration. The resultant container is completely enclosed and, to yield a functional portable urinal, an alternately concave and convex oval plastic portion covering the urinal mouth must be cut away.

However, cutting an opening in a blow-molded container without leaving a sharp inner edge has been difficult with available prior art tools and techniques. This is especially true with respect to a urinal such as that disclosed in the '571 patent, where the mouth must be cut smooth enough so as not to present a hazard to a male user.

Trimming an alternately concave and convex oval, such as a universal urinal mouth, with a knife blade moved in a single plane results in knife chatter, thus creating sharp cerrations on the cut plastic and placing undue strain on the knife blade. Such a technique creates an unacceptably rough mouth opening. Sanding or otherwise smoothing the rough opening results in the production of tiny plastic burrs which become statically charged and attracted to the urinal container surface, thus making it very difficult to clean. Such labor intensive operations are not economically viable in any case.

It is clear then, that a need exists for a trimming apparatus which can trim an alternately concave and convex oval opening in a blow molded receptacle, such as a universal portable urinal, without leaving sharp edges. Such a trimming apparatus must be efficient, capable of yielding relatively large numbers of finished products within a reasonable time, must not create statically charged plastic burrs and, for reasons of economics, must not be labor intensive.

SUMMARY OF THE INVENTION

The present invention is a universal urinal trimming apparatus adapted for trimming the mouth of a universal urinal while leaving no sharp edges or plastic burrs. The apparatus includes a retaining block for securing a blow-molded universal urinal, which block can also simultaneously trim excess plastic or "moil" from the periphery of the urinal. The retaining block orients the urinal in a position which places the urinal mouth, i.e. the axis of an imaginary cylinder upon which the mouth forms a closed loop, perpendicular to a cutting machine. The cutting machine comprises a knife edge which is simultaneously moved in two planes. In a first plane, which is parallel to the plane of orientation of the urinal mouth, the knife describes an oval which traces the basic oval shape of the urinal mouth in that plane. While the knife is moved in the oval pattern in the first plane, it is also simultaneously moved in a second plane which is perpendicular to the first plane. In this second plane the knife is moved longitudinally toward and away from the urinal to trace the alternately concave and convex pattern of the urinal mouth in the second plane. The combined effect of the knife simultaneously moving in two planes results in the knife tracing the closed pattern on the surface of the imaginary cylinder.

The rotary mechanism which moves the knife in the above-described pattern is itself movable in a direction perpendicular to the plane across the urinal mouth. The knife movement in two planes is repeated as the knife is pushed into contact with the molded urinal mouth covering. The repeat pattern of the knife as it contacts the urinal mouth covering gradually erodes the plastic around the urinal mouth, finally causing the entire molded mouth covering to fall away from the urinal body. Thus, a universal urinal results which has a mouth designed to accommodate either male or female patients, and which has no sharp edges which can injure a male user's genitalia.

OBJECTS AND ADVANTAGES OF THE INVENTION

Therefore the objects and advantages of the invention include: providing an improved trimming apparatus; providing such an apparatus which yields a portable urinal or other blow-molded plastic container with a smoothly trimmed mouth; providing such an apparatus which rigidly holds a molded urinal or other container in a position which is aligned with a trimmer; providing such an apparatus which includes a knife which is simultaneously moved in two planes to follow a three dimensional contour of the urinal mouth; providing such an apparatus in which the movement of the trimming knife in two planes erodes the plastic rim of the container mouth covering, thus causing the mouth covering to fall away; providing such an apparatus which trims a urinal in a fashion which yields a product suitable for use by either male or female patients; and providing such an apparatus which is particularly well suited for its intended use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a blow-molded portable urinal with the mouth covering intact, but all excess moil removed.

FIG. 2 is a fragmentary and enlarged side elevational view of the urinal of FIG. 1, with portions broken away to show interior detail thereof.

FIG. 3 is a enlarged end view of the urinal of FIG. 1, taken along line 3—3 of FIG. 2.

FIG. 4 is an enlarged fragmentary cross-sectional view of the urinal, taken along line 4—4 of FIG. 3.

FIG. 2a is a fragmentary view of a urinal trimmed by the trimming apparatus of FIGS. 5-18.

FIG. 2b is a fragmentary cross-sectional view of the urinal of FIG. 2a, taken along line 2b—2b of FIG. 2a.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 2, 2A, 2B, 3, 4:
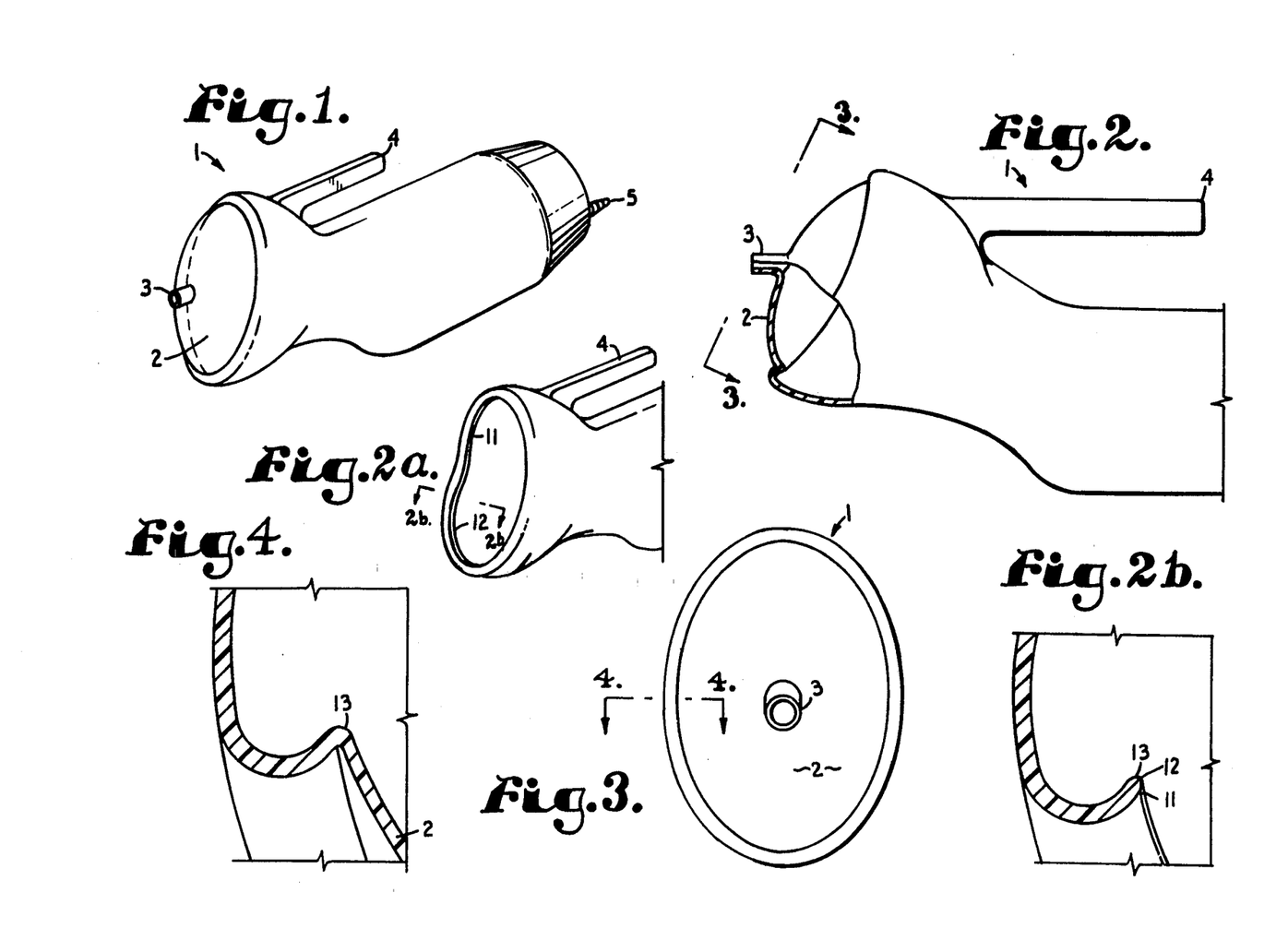

Referring to drawings in more detail, the reference numeral 1 generally represents a blow-molded portable urinal container, shown in FIG. 1 with a molded mouth covering 2 intact. The covering 2 includes a nipple 3 through which air is forced in the molding process. The urinal 1 is preferably provided with a handle 4 and a drain nozzle 5 for connection to a drainage tube (not shown). The urinal 1 is molded with an inwardly directed lip 11 which extends around the circumference of the mouth covering 2, defining the limits of a mouth opening 12 (FIG. 2a) which results from cutting away the mouth covering 2. Located at the actual junction between the mouth covering 2 and the mouth opening 12 is a pronounced ridge 13, as is shown in FIG. 4. FIGS. 2a and 2b illustrate a trimmed urinal 1, with a smoothly cut ridge 13.

FIGS. 5-17 illustrate a trimming apparatus designed to trim the mouth covering 2 from the urinal 1 to yield the finished product illustrated in FIGS. 2a and 2b.

Figure 19:
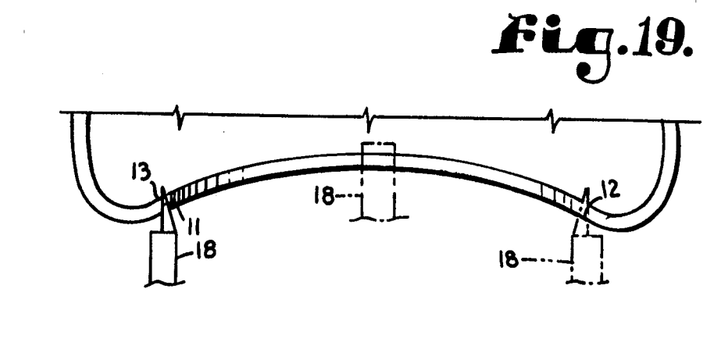
FIG. 19 is an enlarged fragmentary cross-sectional view of the trimming apparatus, taken along line 19—19 of FIG. 6.

Referring to FIGS. 5-17, a retaining block 14, includes a bottom plate 15 and a top plate 16, each with a hollowed section (not shown) sized to accommodate the urinal 1. A urinal 1 is clamped in position for trimming when the top plate 16 is lowered into contact with the bottom plate 15 via a plurality of guide pins 17. The urinal 1 is held with the mouth opening 12 and mouth covering 2 oriented perpendicular to a trimming knife 18 on a rotary trimming assembly 21 of a trimming apparatus 20. The knife 18 can be created by grinding a steel rod to a point, grinding off one half of the resulting taper and then hardening the rod, yielding a stepped knife 18, as is best illustrated in FIG. 19.

Figure 9:
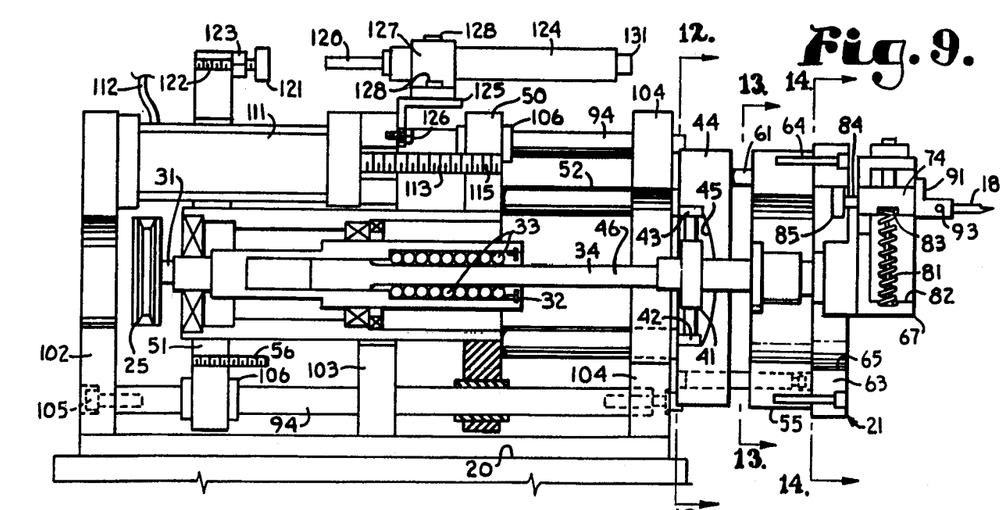
FIG. 9 is a fragmentary cross-sectional view of the trimming apparatus, taken along line 9—9 of FIG. 5, and with the knife edge in its most retracted position.
Figure 10:
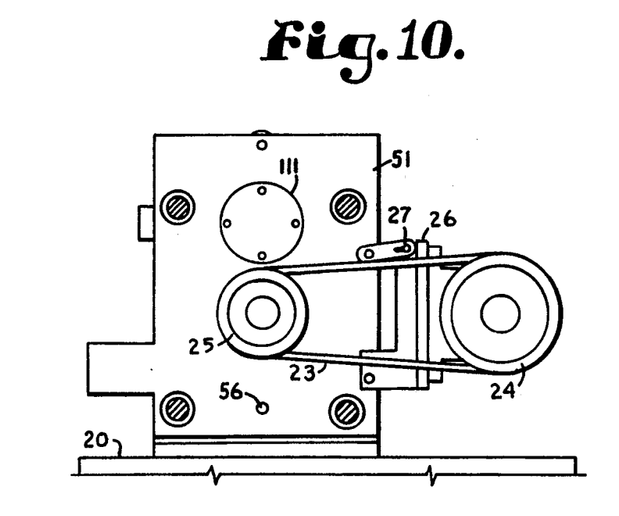
FIG. 10 is a cross-sectional view of the trimming apparatus, taken along line 10—10 of FIG. 8.

The rotary trimming assembly 21 is driven by an electric motor 22 via a "V" belt 23 running on a motor pulley 24 and a driven pulley 25 (FIG. 10). The motor 22 is mounted on a movable mount 26, which is movable toward and away from the pulley 25 via an adjustment screw 27 for belt tensioning purposes. The driven pulley 25 is connected to a main drive spindle 31 (FIG. 9). The spindle 31 turns inside a spindle tube 32 on bearings 33. The spindle tube 32 is held stationary while the spindle 31 is allowed to "float" forward and backward relative to the spindle tube 32.

Figure 13:
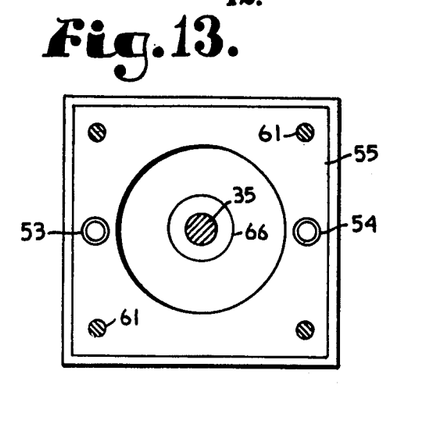
FIG. 13 is a cross-sectional view of the trimming apparatus, taken along line 13—13 of FIG. 9.
Figure 14:
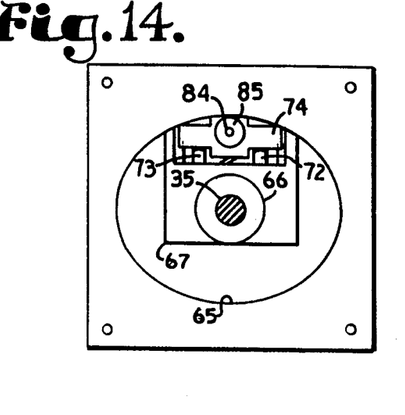
FIG. 14 is a cross-sectional view of the trimming apparatus, taken along line 14—14 of FIG. 9.

A ball spline shaft 34 is connected to the spindle 31 and rotates therewith. The ball spline shaft 34 is connected to a front drive spindle 35, which is, in turn, connected to a thrust bearing shaft 41. The shaft 41 has a pair of cam rollers 42 and 43 connected to the ends thereof. The cam rollers 42 and 43 operate against a rear cam plate 44, which has a rear camming surface 45 which tracks the shape of the mouth 12 of the urinal 1. The rear cam plate 44 is connected to a movable plate 50 via a plurality of connecting rods 52. An additional movable plate 51 provides support for the spindle tube 31. A threaded mechanical stop 56 is provided for adjusting the travel limits of the movable plate 51. A plurality of springs 53 (FIG. 8) are connected between the rear cam plate 44 and a support plate 55, which is movable longitudinally along a plurality of shafts 61 on a corresponding plurality of bushings 62 (FIG. 13). The springs 53 normally urge the support plate 55 forward, or to the right in FIGS. 7-9, and thus act to keep the cam rollers 42 and 43 in constant contact with the camming surface 45 on the rear cam plate 44.

Figure 11:
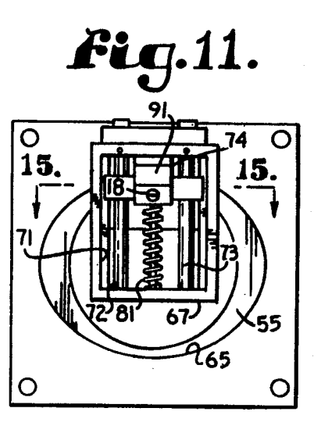
FIG. 11 is an end view of the trimming apparatus with the knife edge in its top position with the spring retracted as it describes an oval pattern.
Figure 12:
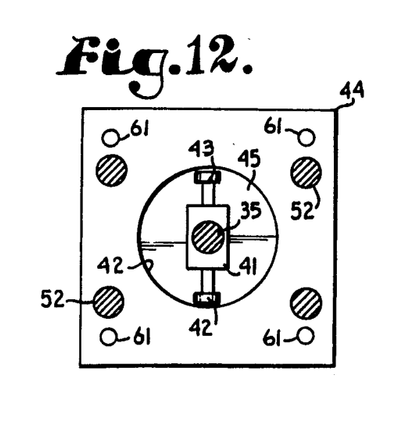
FIG. 12 is a cross-sectional view of the trimming apparatus, taken along line 12—12 of FIG. 9.
Figure 15:
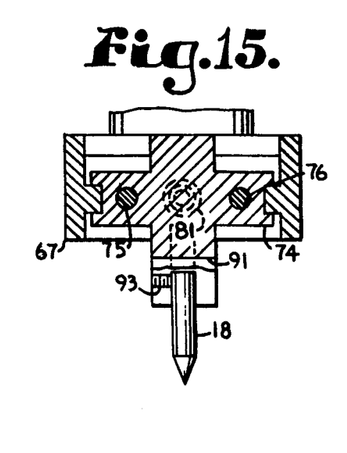
FIG. 15 is a fragmentary cross-sectional view of the trimming apparatus, taken along line 15—15 of FIG. 11.
Figure 16:
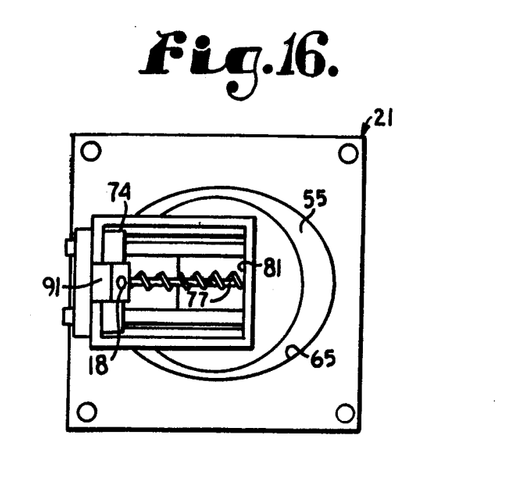
FIG. 16 is an end view of the trimming apparatus with the knife edge in its side position with the spring extended as it describes an oval pattern.
Figure 17:
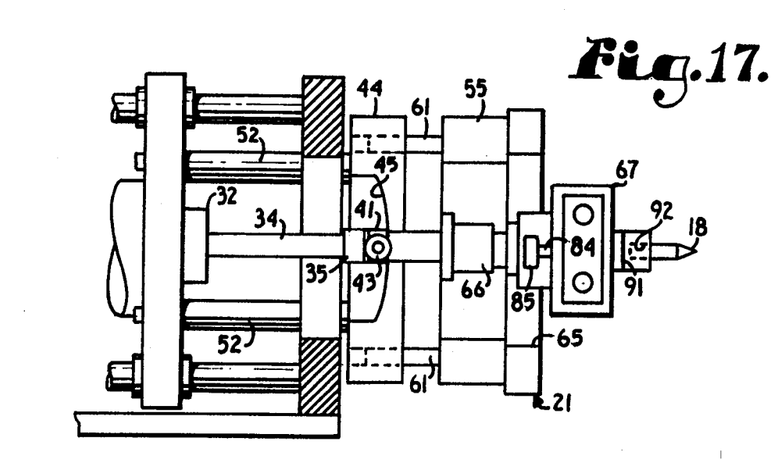
FIG. 17 is fragmentary top plan view of the trimming apparatus, showing the knife edge in its most extended position and partially broken away to illustrate the mechanism therefor.
Figure 18:
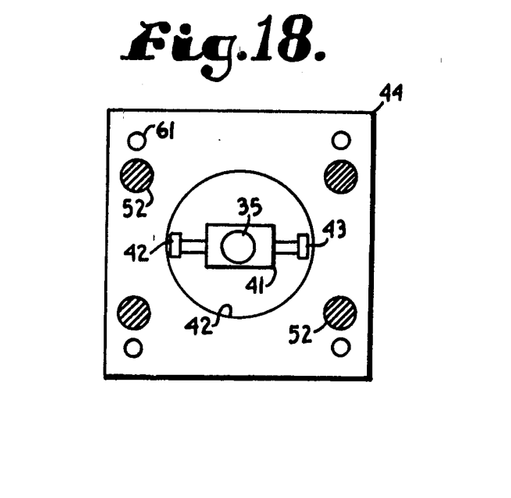
FIG. 18 is a cross-sectional view of the trimming apparatus, taken along line 18—18 of FIG. 17.

A front cam plate 63 is bolted to the support plate 55 via a plurality of threaded bolts 64 (FIG. 9). The front cam plate 63 has an oval shaped internal camming surface 65 which is the same size as the oval mouth 12 of the urinal 1. The front spindle 35 operates within bearings 66 within the support plate 55 and is connected to a knife block 67 which rotates therewith. The knife block 67 has an interior rectangular recess 71 through which a pair of guide pins 72 and 73 extend (FIG. 11). A thrust block 74 includes a pair of apertures 75 and 76 which are sized and positioned to accommodate the shafts 72 and 73 (FIG. 15). A spring 81 is attached between a side 82 of the rectangular opening 71 and a depression 83 within the thrust block 74. The spring 81, which surrounds a guide pin 77(FIG. 16), is operative to normally urge the thrust block 74 outward, away from the surface 82. The thrust block 74 is also connected to one end of a cam shaft 84, with the other end of the shaft 84 connected to a roller cam 85. The roller cam 85 is urged into contact with the internal camming surface 65 of the front cam plate 63 by the action of the spring 81. The thrust block 74 includes an "L" shaped extension 91 with an internal bore 92 which is sized to accommodate the trimming knife 18 which can be held in position by a set screw 93.

The rotary subassembly 21 includes the plates 50 and 51 which are movable longitudinally along a set of four rails 94 within a stationary assembly 101. A set of three stationary plates 102-104 collectively support the four rails 94, which can be attached via bolts 105 (shown in phantom lines in FIG. 9). A set of bushings 106 allow the plates 50 and 51 to freely move along the rails 94. Referring to FIGS. 5-9, the movement of the plates 50 and 51 along the rails 94 causes the entire rotary assembly 21 is adapted to move to the right relative to the stationary assembly 101. An air cylinder 111 is anchored to the middle stationary plate 103 (FIG. 9). The air cylinder 111 is connected to a source of compressed air via a hose 112, and is operative to extend a telescoping arm 113 when charged with compressed air. The telescoping arm 113 is connected to the movable plate 50 via a threaded screw 115. Thus, when the cylinder 111 is charged, the arm 113 is extended to the right in FIG. 5, pushing the rotary assembly 21 to a position in which the knife 18 contacts the urinal mouth covering 2, as shown in FIG. 6. As the air cylinder 111 is initially charged, the assembly 21 is rapidly moved to the right. A check adjustment rod 121 is threadably attached to a bore 122 near the top of the movable plate 50. The check adjustment rod 121 is adjustable in and out of the threaded bore 122 and can be fixed in place by tightening a retaining nut 123 snugly against the plate 50. A hydrocheck valve 124 is attached to the top of the stationary plate 103 via an "L" shaped bracket 125 which is attached to the plate 103 by a screw 126. The hydrocheck valve 124 can be attached by a clamp 127 and a plurality of bolts 128. The hydrocheck valve 124 includes an operating arm 120 which is positioned in close proximity to the check adjustment rod 121.

As the assembly 21 is pushed to the right, the check adjustment rod 121 contacts the operating arm 120 of the hydrocheck valve 124 and the forward motion of the assembly 21 is slowed to a nominal cutting feed rate by the action of the hydrocheck valve 124. The cutting feed rate is adjustable via an adjustment knob 131.

The operation of the trimming apparatus 20, including the rotary subassembly 21 and the sliding subassembly 101 will now be described with reference to FIGS. 1-19.

Figure 5:
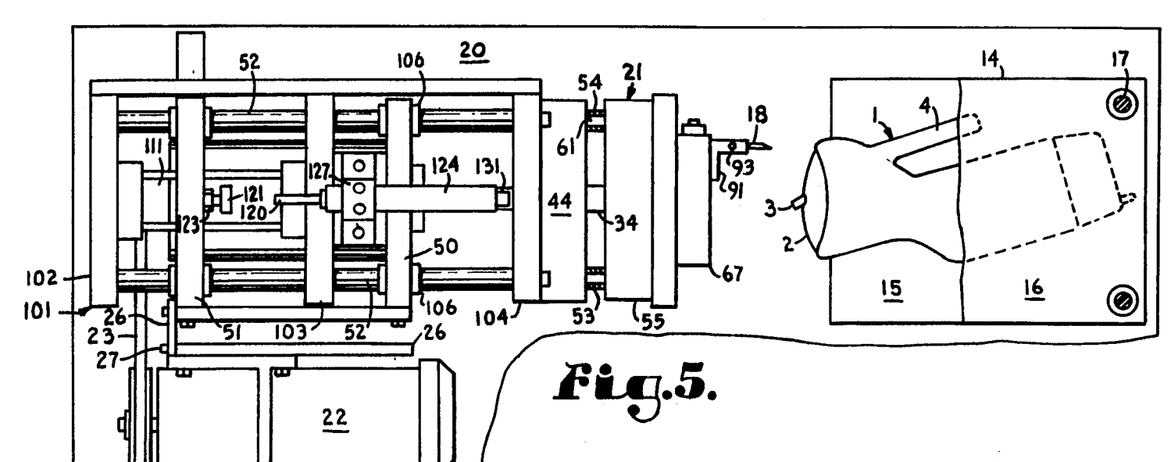
FIG. 5 is a top plan view of a trimming apparatus and retaining block holding a urinal in position for trimming, with the top half of the retaining block partially broken away to illustrate the urinal position and with a portion of the urinal illustrated in phantom lines.
Figure 6:
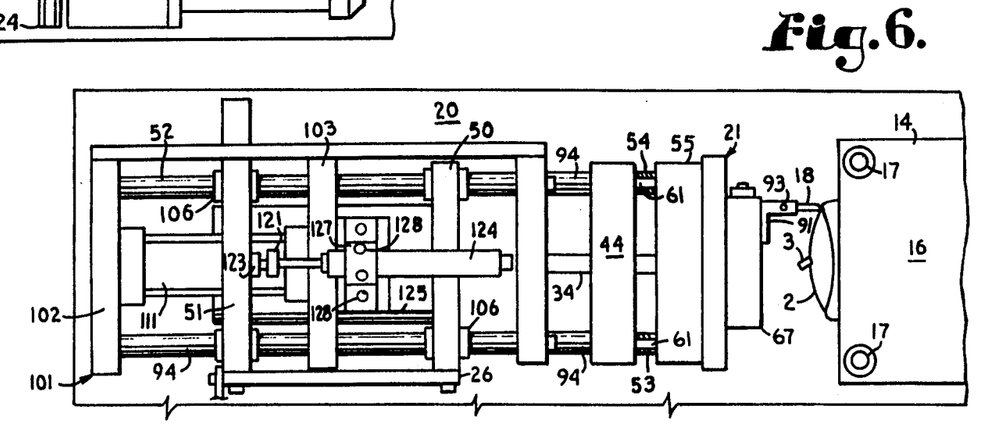
FIG. 6 is a fragmentary top plan view of the trimming apparatus shown with the knife edge contacting the urinal mouth covering and with the knife in its most retracted position.

A blow molded urinal 1 is inserted, by machine or by hand, into the bottom half 15 of the retaining block 14, as shown in FIG. 5. The top plate 16 of the retaining block 14 is lowered onto the bottom plate 15 via the guide pins 17, thus clamping the urinal 1 in place. The motor 22 is then started, causing the V belt 23 to drive the pulley 25 and the drive spindle 31 in a rotary motion. The drive spindle 31 is free to move longitudinally relative to the spindle tube 32 by riding on the bearings 33. The ball spline shaft 34 is rotated with the drive spindle 31, and, in turn, causes the thrust bearing shaft 41 to spin about an axis point 46 centered on the ball spline shaft 34. This causes the cam rollers 42 and 43 to roll about the circumference of the rear camming surface 45 of the rear cam plate 44. The springs 53 connected between the stationary rear cam plate 44 and the movable support plate 55 urge the cam rollers 42 and 43 to the right, causing them to constantly contact the rear camming surface 45. This action, combined with the shape of the rear camming surface 45, which is the same as the urinal mouth 12, cause the front drive spindle 35 to move forward and backward (to the right and left in FIGS. 5-9) as the thrust bearing shaft 41 spins.

The front drive spindle 35 is rigidly connected to a knife block 67 via an internal bore 66 which is positioned off-center of the knife block 67. Thus the rectangular knife block 67 rotates in an eccentric fashion with the front drive spindle 35 and is pushed forward and backward with the similar motion of the spindle 35. As the knife block 67 eccentrically rotates, the spring 81 urges the thrust block 74 outward, thus forcing the connected roller cam 85 to remain in constant contact with the oval-shaped internal camming surface 65 of the front cam plate 63.

The effect of the roller cam 85 causes the knife 18 to describe an oval pattern with an outer perimeter matching the rim of the urinal mouth 12. At the same time, the roller cams 42 and 43 cause the knife 18 to be moved toward and away from the urinal mouth 12. The net effect of this dual action is the knife 18 synchronously describing a motion which duplicates the shape of the urinal mouth 12.

At the same time, the air cylinder 111 is charged with air via the hose 12, forcing the telescoping arm 113 outward, urging the rotary assembly 21 toward the urinal 1. The check adjustment rod 121 and the hydrocheck valve 124 are adjusted so that the forward motion of the rotary assembly 21 is slowed just as the knife 18 contacts the mouth covering 2 of the urinal 1. The forward motion then assumes a nominal cutting feed rate which causes the knife 18 to erode the urinal covering 2 without subjecting the knife 18 to undue strain.

Figure 7:
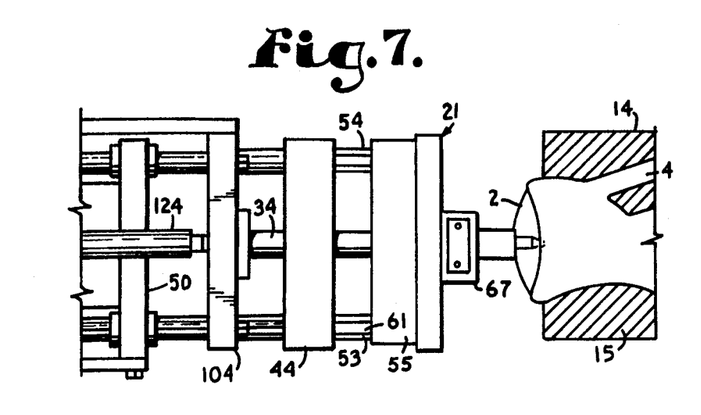
FIG. 7 is a fragmentary top plan view of the trimming apparatus shown with the knife edge contacting the urinal mouth covering and with the knife in its most extended position.
Figure 8:
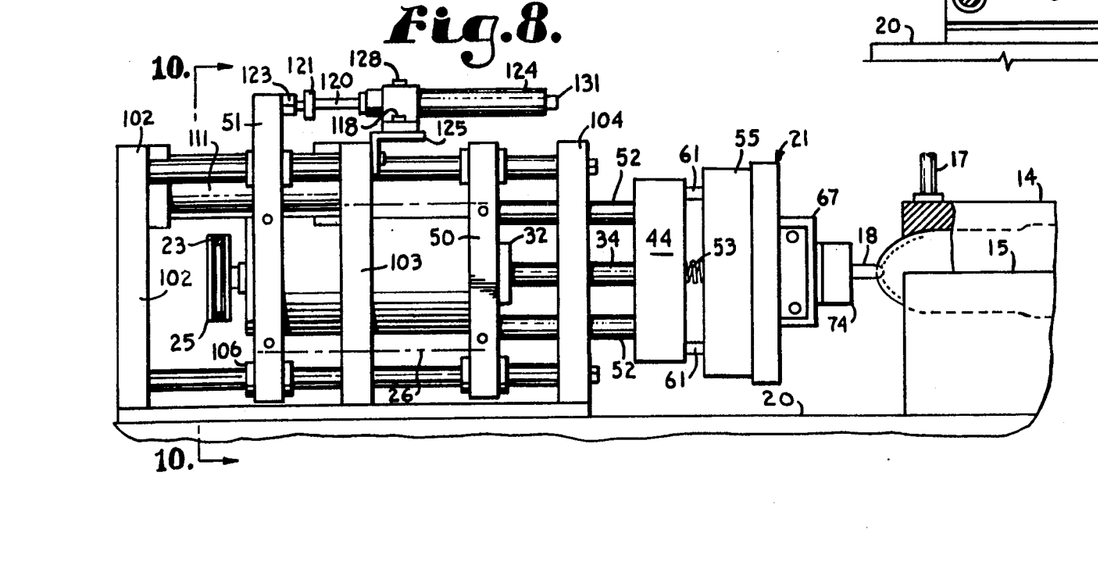
FIG. 8 is a fragmentary side-elevational view of the trimming apparatus shown with the knife edge contact the urinal mouth covering and with the knife in its most retracted position on the far side of the urinal.

The sequence of stages illustrated in FIGS. 5-8 are as follows:

In FIG. 5, the urinal 1 is clamped in the retaining block 14 and the motor 22 is turning, thus rotating the main drive spindle 31 and moving the knife 18 in the prescribed pattern. At FIG. 6, the air cylinder 111 has been charged, propelling the rotary assembly 21 forward until the knife 18 contacts the mouth covering 2 of the urinal 1. The knife 18 in FIG. 6 is at the most retracted position as it traces the center one concave side of the oval opening 12. In FIG. 7, the knife 18 is at its most extended position as it traces the center of one convex side of the oval opening 12. In FIG. 8, the knife 18 is again at its most retracted position as it traces the center of the opposite concave side of the oval opening 12.

The combined oval and longitudinal motion of the knife 18 keeps it in constant contact with the covering 2, thus minimizing or eliminating knife chatter and minimizing strain on the knife 18. The results are a urinal 1 with cleanly cut mouth 12 with no sharp edges which could endanger a male user.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for trimming an opening which has an oval shape in a first plane and an alternately concave and convex shape in a second plane, the apparatus comprising:
   (a) a trimming means;
   (b) mechanical means for moving said trimming means in a first path which describes said oval shape in said first plane while simultaneously moving the trimming means in a second path which describes said alternately concave and convex shape in the second plane;
   (c) a platform means for mounting said trimming means and said mechanical means, said platform means being movable in said second plane independently of said mechanical movement of said trimming means; and
   (d) means for simultaneously propelling said platform in said second plane as said trimming means is moved in said first and second paths.

2. An apparatus for trimming an opening from a blow-molded plastic article where the opening has an oval shape in a first plane and an alternately concave and convex shape in a second plane which is orthogonal to said first plane, the apparatus comprising:
   (a) a trimming means;
   (b) a mechanical means comprising a first means for moving said trimming means in a first path which describes said oval shape in said first plane and second means for simultaneously moving said trimming means in a second path which describes said alternately concave and convex shape in the second plane;
   (c) a platform means for mounting said trimming means and said mechanical means, said platform means being movable in said second plane independently of said movement of said trimming means; and
   (d) means for simultaneously propelling said platform means towards said article in said second plane as said trimming means is moved in said first and second paths so that said trimming means trims said opening by eroding the plastic around the opening.

3. An apparatus as in claim 2, wherein:
   (a) said trimming means comprises a knife means.

4. An apparatus as in claim 3, wherein said blow-molded article comprises a universal urinal and said opening is a urinal mouth, and further including:
   (a) a means for holding said urinal with the first plane oriented perpendicular to said knife means.

5. An apparatus as in claim 4, wherein:
   (a) said mechanical means comprises
      (i) a rotatable shaft which is adapted to be movable longitudinally toward or away from said urinal; and
      (ii) means for rotating said shaft.

6. An apparatus as in claim 5, wherein:
   (a) said first means for moving comprises
      (i) a knife block, said knife block being attached to said shaft and being rotatable therewith;
      (ii) a knife mounting means for holding said knife means, said knife mounting means being movable toward and away from said shaft within said knife block; and
      (iii) a spring means attached at one end to said knife block and at the other end to said knife mounting means, said spring means normally urging said knife mounting means away from said shaft.

7. An apparatus as in claim 6, wherein:
   (a) said first means for moving further comprises:
      (iv) a first plate with a first camming surface;
      (v) a first cam means attached to said knife mounting means, said first cam means rolling about the periphery of said first camming surface as said knife block is rotated with said shaft; whereby
   (b) said knife mounting means and said knife means follow the contour of said camming surface as said shaft is rotated.

8. An apparatus as in claim 7, wherein:
   (a) said periphery of said first camming surface is shaped as an oval.

9. An apparatus as in claim 7, wherein:
   (a) said second means for moving comprises a second cam means connected to said shaft and adapted to be rotated therewith and a second plate with a second camming surface upon which said cam means rolls while being rotated, said second camming surface comprising an alternately concave and convex shape to simulate the pattern of said opening in said second plane; whereby
   (b) said shaft is alternately moved toward and away from said urinal mouth via the motion of said second cam means on said second camming surface.

10. An apparatus as in claim 9, wherein:
    (a) said means for propelling said platform comprises:
       (i) an air cylinder with a telescoping arm attached to said platform, said arm being extended as said cylinder is charged with compressed air; and
       (ii) a hydrocheck valve adapted to slow the motion of said platform as said knife means approaches said urinal mouth.

11. An apparatus as in claim 10, and further comprising:
    (a) a plurality of stationary guide rails upon which said platform rides as it is propelled toward said urinal;
    (b) a plurality of stationary supports for supporting said guide rails, said hydrocheck valve being attached to one of said supports.

12. An apparatus as in claim 2, wherein:
    (a) said means for propelling said platform comprises:

(i) an air cylinder with a telescoping arm attached to said platform, said arm being extended as said cylinder is charged with compressed air; and (ii) a hydrocheck valve adapted to slow the motion of said platform as said knife means approaches said urinal mouth.

13. A trimming apparatus comprising:

(a) a knife;

(b) a mechanical means comprising a first means for moving said knife in a first path which describes an oval shape in a first plane and a second means for simultaneously moving said knife in a second path which describes an alternately concave and convex shape in a second plane orthogonal to said first plane; and (c) a platform means for mounting said knife and said mechanical means, said platform means being movable in said second plane independently of said movement of said knife in said first and second paths.

14. An apparatus as in claim 13, wherein:

(a) said mechanical means comprises (i) a rotatable shaft which is adapted to be movable longitudinally forward and backward in said second plane; and (ii) means for rotating said shaft.

15. An apparatus as in claim 14, wherein:

(a) said first means for moving comprises (i) a knife block, said knife block being attached to said shaft and being rotatable therewith;

(ii) a knife mounting means for holding said knife, said knife mounting means being movable toward and away from said shaft within said knife block; and (iii) a spring means attached at one end to said knife block and at the other end to said knife mounting means, said spring means normally urging said knife mounting means away from said shaft.

16. An apparatus as in claim 15, wherein:

(a) said first means for moving further comprises:

(iv) a first plate with a first camming surface;

(v) a first cam means attached to said knife mounting means, said first cam means rolling about said first camming surface as said knife block is rotated with said shaft; whereby (b) said knife mounting means and said knife follow the contour of said camming surface as said shaft is rotated.

17. An apparatus as in claim 16, wherein:

(a) said first camming surface is shaped as an oval.

18. An apparatus as in claim 16, wherein:

(a) said second means for moving comprises a second cam means connected to said shaft and adapted to be rotated therewith and a second plate with a second camming surface upon which said second cam means rolls while being rotated, said second camming surface comprising an alternately concave and convex shape to simulate said second path in said second plane; whereby (b) said shaft is alternately moved forward and backward in said second plane via the motion of said second cam means on said second camming surface.

19. An apparatus as in claim 18, and further comprising:

(a) means for propelling said platform in said second plane simultaneously with the movement of said knife in said first and second paths.

20. An apparatus for trimming an opening from a blow-molded plastic urinal where the opening has a first, oval shape in a first plane and an alternately concave and convex shape in a second plane which is orthogonal to said first plane, the apparatus comprising:

(a) a knife means and a retaining block for holding the urinal with the first plane oriented perpendicular to said knife means;

(b) a mechanical means comprising a first means for moving said knife means in an oval path in said first plane and a second means for simultaneously moving said knife means in an alternately concave and convex path in said second plane;

(c) a platform means for mounting said knife means and said mechanical means, said platform means being movable in said second plane independently of said mechanical movement of said knife; and (d) means for propelling said platform towards said urinal in said second plane as said knife means is mechanically moved so that said knife means trims said opening by eroding the plastic around the opening.

21. An apparatus as in claim 20, wherein:

(a) said mechanical means comprises (i) a rotatable shaft which is adapted to move longitudinally toward or away from said urinal; and (ii) means for rotating said shaft; and (b) said first means for moving comprises (i) a knife block, said knife block being attached to said shaft and being rotatable therewith;

(ii) a knife mounting means for holding said knife means, said knife mounting means being movable toward and away from said shaft within said knife block; and (iii) a spring means attached at one end to said knife block and at the other end to said knife mounting means, said spring means normally urging said knife mounting means away from said shaft;

(iv) a first plate with a first camming surface; and (v) a first cam means attached to said knife mounting means, said first cam means rolling about said first camming surface as said knife block is rotated with said shaft; whereby (b) said knife mounting means follows the contour of said camming surface as said shaft is rotated.

22. An apparatus as in claim 21, wherein:

(a) said second means for moving comprises a second cam means connected to said shaft and adapted to be rotated therewith and a second plate with a second camming surface upon which said second cam means rolls while being rotated, said second camming surface comprising an alternately concave and convex shape to simulate the pattern of said opening in said second plane; whereby (b) said shaft is alternately moved toward and away from said urinal mouth via the motion of said second cam means on said second camming surface.

23. An apparatus as in claim 22, wherein:

(a) said means for propelling said platform comprises:

(i) an air cylinder with a telescoping arm attached to said platform, said arm being extended as said cylinder is charged with compressed air; and (ii) a hydrocheck valve adapted to slow the motion of said platform as said knife means approaches said urinal mouth.

* * * * *